March 10, 1964  W. A. SAVIN  3,124,690
RADIATION SENSING SYSTEM FOR AUTOMATICALLY GUIDING
AND POSITIONING PLANES ON AIRCRAFT CARRIERS
Filed March 31, 1961  2 Sheets-Sheet 2
*Fig 2*
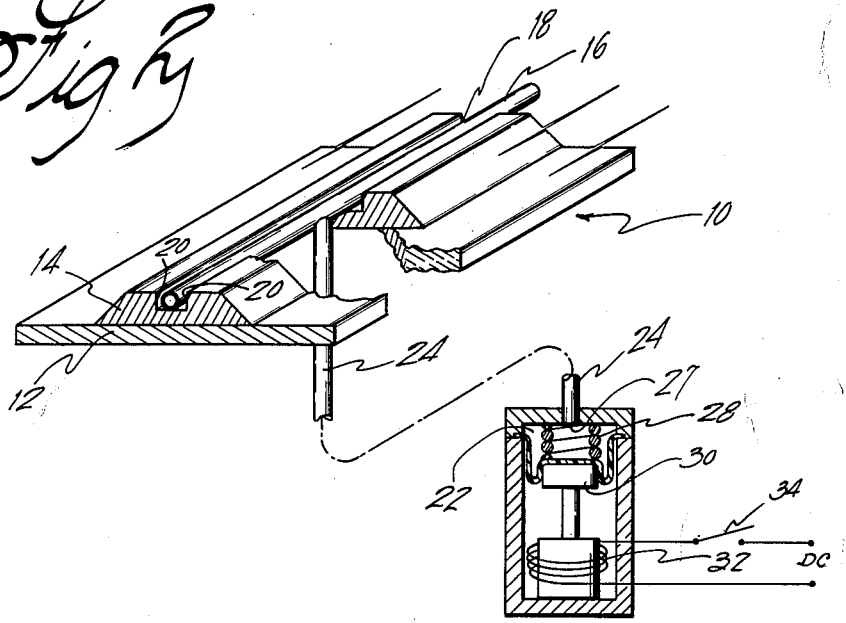
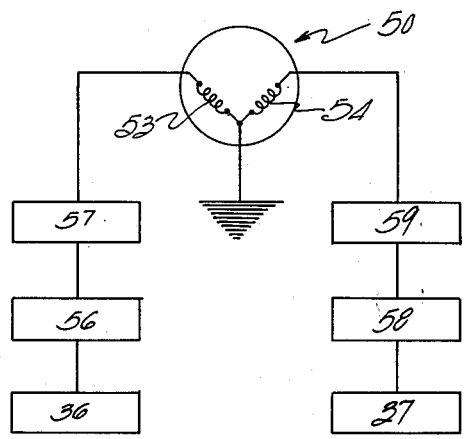
*Fig 3*
INVENTOR.
William A. Savin
BY
*Arthur N. Carlino*
ATTORNEY

United States Patent Office 3,124,690
Patented Mar. 10, 1964

3,124,690
RADIATION SENSING SYSTEM FOR AUTOMATICALLY GUIDING AND POSITIONING PLANES ON AIRCRAFT CARRIERS
William A. Savin, Philadelphia, Pa., assignor to the United States of America as represented by the Secretary of the Navy
Filed Mar. 31, 1961, Ser. No. 99,970
2 Claims. (Cl. 250—106)
(Granted under Title 35, U.S. Code (1952), sec. 266)

The invention described herein may be manufactured and used by or for the Government of the United States of America for governmental purposes without the payment of any royalties thereon or therefor.

This invention relates to automatic guiding devices particularly for steering aircraft into position for catapult launching.

To launch an aircraft by catapult, as from an aircraft carrier, it is required that the plane be spotted on a precise point for hook-up to the catapult. Ordinarily it is taxied under its own power from a stand-by position for about 140 feet to the catapult shuttle. Positioning must be within 2 or 3 inches of the catapult centerline. This takes about thirty seconds, the allowed time in launching operations. The usual method employed is for the pilot to steer the plane in accordance to hand signals by deck personnel.

Because of the number of people required to perform the operation, the danger to them by the plane's jet blast, and obvious delays in plane positioning time that are occasioned by the weather or deck conditions, an automatic steering device is needed. The device offered as a solution, however, must contend with a steel deck, it must not project more than a couple of inches above the deck surface, it should not present interference to the deck's jet blast deflectors, or expansion joints, or restrict bomb elevators and deck openings, or interfere with the aircraft's or carrier's electronic equipment.

With the above in mind, it is a point of this invention to provide a device which will automatically steer an aircraft and which has a construction that permits its operation within the limits adverted to.

Other objects and advantages will be appreciated from the following description when considered in connection with the attached drawing.

In general, the objective of the invention is achieved by a guide path laid along the plane's course of travel using a low level collimated source of gamma radiation. Radiant energy detector devices mounted on the aircraft sense variations in the level of ionization radiation determined by their distance from the guide path and produce electrical signals. After amplification the electrical signals are conducted to apparatus that actuates steering mechanism on the aircraft's landing gear for correcting its deviation from the path.

In the drawing, FIGURE 1 shows perspectively a portion of a take-off surface and aircraft landing gear having the invention;

FIGURE 2 is a cross section along line 2—2 of FIGURE 1 showing means for controlling radiation;

FIGURE 3 is a diagrammatic showing of an electrical system used by the invention.

Figure 1:
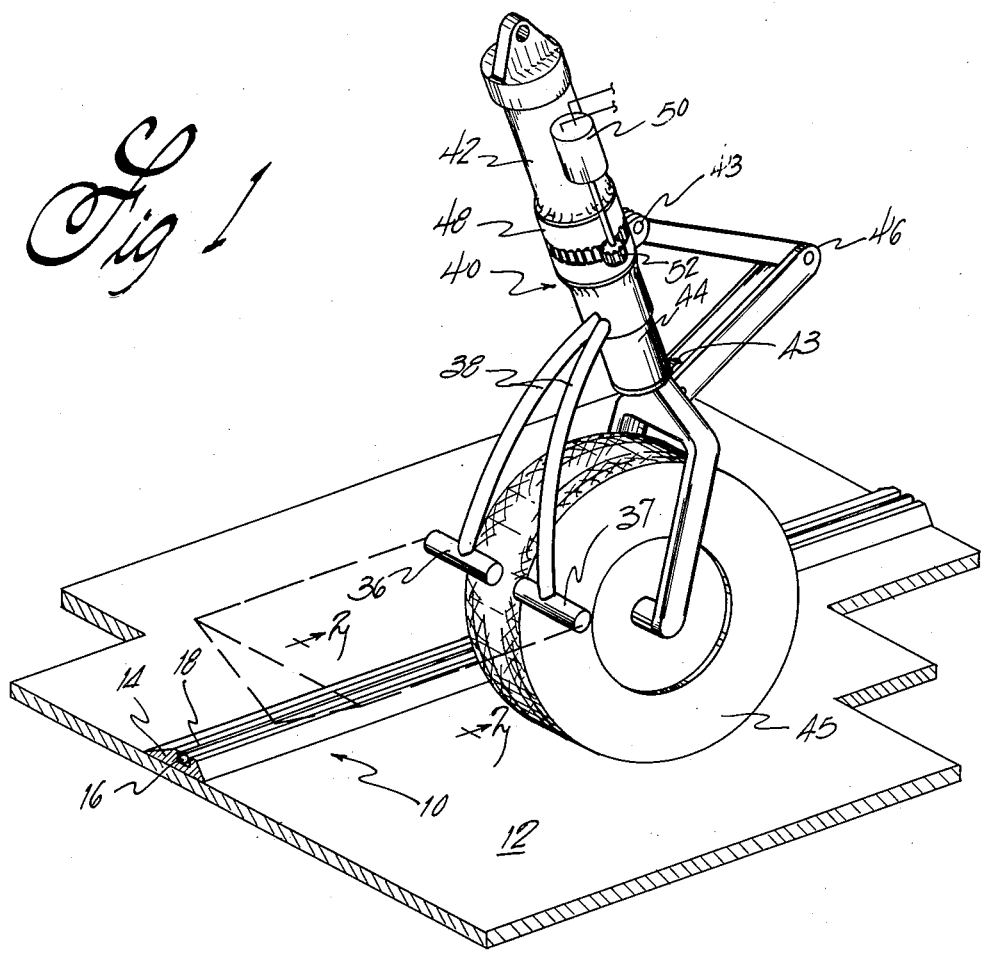

Referring to the drawing, the numeral 10 indicates generally a signal or radiation path on the deck 12 of an aircraft carrier leading to a catapult, not shown. It includes a shield 14 and a container 16 having a source of ionizing radiation. The shield 14 is an elongated metallic strip of sufficient thickness to make it impermeable to beta and gamma rays emitted at the rate of one milli-roentgen per hour and has a cross-sectional shape which permits its ready negotiation by the wheels of an aircraft, for instance a one inch thick stainless steel strip that is a truncated triangle in cross-section; obviously it may be sunk flush with the deck, if so desired.

The container 16 is disposed in a longitudinal groove 18 cut into the top of the shield 14; it is a capillary tube, with closed ends, and is made of thin stainless steel which is impermeable to beta rays but not gamma, about .01 in thickness is satisfactory. The sidewalls, 20, of the groove 18 are inclined, or vertically directed as shown in FIGURE 2, to collimate the radiation in a desired direction.

Within the container or tube 16 is a gamma ray emitting source of ionization radiation. The wave length of gamma rays is .000001 cm., which is sufficiently smaller than the .1 cm. wave length operating electronic equipment aboard ship and aircraft so as to be unable to interfere with their normal functioning. Krypton 85 is the preferred source of ionization radiation. This is an inert gas which suffers no deleterious emission effects even if subjected to 1000° F. temeperatures, and, thus, can withstand a jet blast. Since it is a gas, it is readily dispersed in the atmosphere and leaves no decontamination problem in the event of leakage. It does not combine with the body tissue even if placed in direct contact; if inhaled, it is expelled on the next breath.

Though predominantly a beta ray emitter, krypton 85 also emits the desired gamma ray. The beta ray is of low penetrating power, susceptible to being shielded by dirt, grease, etc., which is apt to accumulate aboard a carrier, and producing spurious signals. It is shielded by the walls of tube 16. The gamma ray is highly penetrative and while there is a hazard to personnel from the effects of gamma rays, it should be appreciated that the invention requires an emission of only one milli-roentgen per hour at a distance of 18 inches from the source. On the other hand, the maximum permissible dosage of radiation to which a person can safely be exposed is considered to be 5 rem per year; the rem (relative biological effectiveness) is numerically equal to the roentgen for low level radiation. In evaluating the time of exposure of various crew members, it has been determined that the actual received radiation dosage is no more than one-tenth of the permitted level. However, radiation exposure is still further reduced by the provision of a pressure system which is capable of decreasing the pressure on the krypton 85 and its radiation thereby during non-launching periods.

In FIGURE 2, the pressure system is shown to take the form of a cylinder or supply chamber 22 having a volume equal to or more than that of tube 16 and to which it is communicately connected by a tube 24. A diaphragm 26 covers the orifice 27 to tube 24 and is held away from it under the tension of a spring 28. A piston 30 under the diaphragm 26 urges it upwardly with energization of a solenoid 32, after a switch 34 is closed. Raising the diaphragm 26 forces the krypton 85 from chamber 22 into tube 16, compressing it and raising its intensity to an operational level. Withdrawing the diaphragm reduces the pressure on the krypton 85 and lowers its radiation level.

The guide paths may be laid out as one continuous unit or a plurality of independent units. Small separations between them practically have no effect, because there is a commingling or lapping over of emanations. The system thus lends itself to shipboard use, as where the deck has an elevator. A separate emission path may be laid out on the elevator that mates at its ends with paths on the deck.

Emanations from the tube 16 activate radiation detector elements 36 and 37 supported by tubes 38 fixedly secured to the fixed nose wheel strut 42 of an aircraft landing gear 40. With the nose wheel resting on the deck, the radiation elements 36 and 37, are 12 to 18 inches above the deck and are adapted to equally sense radiation levels of .5 to 1.25 mr. per hour. A Geiger-Muller counter or the like is appropriate.

The landing gear is shown to include the pivoted outer tube 42 adapted to be connected to the frame of an aircraft (not shown) and an inner piston or strut 44 telescoping within the cylinder 42 having a ground engaging nose wheel 45. Torque links, 46 and 46, connect the inner piston 44 to a ring gear 48, rotatively mounted on the outer surface of cylinder 42. The ends of links 46 are connected to lugs 43, projecting from inner piston 44 and ring gear 48, to permit pivoting of the links in only a vertical plane and impart rotative motion from the ring gear to the inner piston while permitting telescopic action between them. Steering power is furnished by a reversible motor 50, suitably fixed to outer tube 42 by welds or the like (not shown), having a pinion gear 52, mounted on the armature shaft 51, meshed with ring gear 48 and having counter-acting fields 53 and 54. Detector element 36 (FIG. 3) is connected to field 53 through amplifiers 56 and 57; whereas, detector element 37 is similarly coupled to field 54 through amplifiers 58 and 59. The amplifiers 56 and 58 are conventional and are provided to increase the strength of the signals to a level which will control the amplifiers 57 and 59; the latter are preferably Amplidyne generators, having an external source of power not shown, that regulate the direction and amount of output.

In operation, the aircraft is positioned the proper distance from the guide path so that the detector elements detect substantially equal amounts of radiation. A shielding sleeve, not shown, of suitable material may be placed over one of the detectors to create equality. The aircraft is then moved forward and if there is a departure from the guide path 10 by the nose wheel, the radiation detected by elements 36 and 37 will differ, and their output signals thereby will change causing unequal excitations in fields 53 and 54. As a result pinion gear 52 is rotated in a direction determined by the field which is predominantly energized. This motion will be transmitted to the nose wheel through ring gear 48 and torque links 46 and the aircraft will be returned to the guide path.

As many changes could be made in the construction without departing from the scope of the invention as defined in the following claims, it is intended that all matter contained in the above description, or shown in the accompanying drawing, shall be taken as illustrative only and not in a limiting sense.

What is claimed is:
1. An automatic steering system for guiding aircraft having wheel landing gear along a predetermined path on a metallic landing surface into a desired position for launching said aircraft, comprising an elongated, open top, stainless steel container having a wall thickness of approximately one inch and secured to said surface along said predetermined path,
   a stainless steel capillary tube disposed in said container having a wall thickness of approximately one hundredth of an inch,
   a gamma ray source within said tube having an emission rate of one mr. per hour at a distance of about eighteen inches, said landing gear including an outer tube with a wheel supporting inner piston tube for swivelable movement therebetween,
   a ring gear rotatably mounted on said outer tube,
   link means connecting said ring gear and inner piston for transmitting rotative motion therebetween while permitting telescopic action between said tube and said piston,
   a reversible motor supported on said outer tube having a pinion meshed with said ring gear for rotation thereof,
   a pair of gamma ray detectors supported from said outer tube above said container for detecting unequal amounts of gamma emissions with lateral movement of said landing gear relative said path and producing electrical signals, and circuit means coupling said detectors to said motors for actuation thereof upon production of said unequal signals.
2. The system of claim 1 wherein said gas is krypton 85 and including compression means for increasing the pressure of said gas.

References Cited in the file of this patent
UNITED STATES PATENTS

| | | |
|---|---|---|
| 1,948,552 | Weber | Feb. 27, 1934 |
| 2,339,291 | Paulus et al. | Jan. 18, 1944 |
| 2,656,470 | Herzog | Oct. 20, 1953 |
| 2,750,583 | McCullough | June 12, 1956 |
| 2,796,685 | Bensinger | June 25, 1957 |
| 2,884,538 | Swift | Apr. 28, 1959 |
| 2,992,330 | Cooper et al. | July 11, 1961 |